(12) United States Patent
Kloos et al.

(10) Patent No.: US 7,461,725 B2
(45) Date of Patent: Dec. 9, 2008

(54) DISK BRAKE

(75) Inventors: Eugen Kloos, Bensheim (DE); Frank Beyer, Mannheim (DE)

(73) Assignee: WABCO Radbremsen GmbH, Mannheim (DE)

( * ) Notice: Subject to any disclaimer, the term of this patent is extended or adjusted under 35 U.S.C. 154(b) by 0 days.

(21) Appl. No.: 10/656,903

(22) Filed: Sep. 5, 2003

(65) Prior Publication Data

US 2004/0074710 A1    Apr. 22, 2004

(30) Foreign Application Priority Data

Sep. 5, 2002    (DE) ................. 102 41 157

(51) Int. Cl.
*F16D 65/00*    (2006.01)
(52) U.S. Cl. ................. 188/73.1; 188/250 B
(58) Field of Classification Search ........... 188/73.1, 188/73.35, 73.36, 73.37, 250 R, 250 B, 250 G, 188/72.5

See application file for complete search history.

(56) References Cited

U.S. PATENT DOCUMENTS

| | | | |
|---|---|---|---|
| 3,166,157 A | | 1/1965 | Burnett |
| 3,422,935 A | | 1/1969 | Van House |
| 4,220,223 A | * | 9/1980 | Rinker et al. ............... 188/73.1 |
| 4,225,017 A | * | 9/1980 | Op den Camp .......... 188/73.38 |
| 4,391,355 A | * | 7/1983 | Evans ...................... 188/73.44 |
| 4,533,025 A | | 8/1985 | Carre |
| 4,632,227 A | | 12/1986 | Mery et al. |
| 4,705,146 A | * | 11/1987 | Tarter ........................ 188/73.1 |
| 5,464,077 A | * | 11/1995 | Thiel et al. ................. 188/72.5 |
| 5,593,005 A | * | 1/1997 | Kullmann et al. .......... 188/72.4 |
| 5,701,978 A | * | 12/1997 | Weiler et al. ............. 188/73.32 |

FOREIGN PATENT DOCUMENTS

| | | |
|---|---|---|
| DE | 197 43 538 A1 | 4/1999 |
| EP | 0709592 | 1/2000 |
| GB | 1066442 | 4/1967 |
| JP | 0932870 | 7/1995 |

* cited by examiner

*Primary Examiner*—Bradley T King
(74) *Attorney, Agent, or Firm*—Friedrich Kueffner

(57) ABSTRACT

A disk brake includes a brake disk with a preferred rotational direction, with a first brake pad with a first center of gravity on a first side of the brake disk, a second brake pad with a second center of gravity on a second side of the brake disk, and a caliper for transmitting the braking forces produced by the second brake pad to the first side of the brake disk. The second center of gravity is offset from the first center of gravity by a predetermined distance in the direction toward the side of the brake disk that trails when the disk is rotating in its preferred direction.

13 Claims, 3 Drawing Sheets

DISK BRAKE

BACKGROUND OF THE INVENTION

1. Field of the Invention

The present invention relates to a disk brake
with a brake disk having a preferred rotational direction;
with a first brake pad with a first center of gravity on a first side of the brake disk;
with a second brake pad with a second center of gravity on a second side of the brake disk; and
with a caliper for transmitting the braking forces generated by the second brake pad to the first side of the brake disk.

2. Description of the Related Art

In general, the design and operation of disk brakes differ depending on the way the clamping device is installed in the brake caliper. FIGS. 1-4 show examples, namely:

FIG. 1 shows a schematic cross-sectional view of a sliding caliper disk brake with one-sided clamping according to the reactive-force principle;

FIG. 2 shows a schematic cross-sectional view of a fixed caliper disk brake with one-sided clamping according to the reactive-force principle with a floating brake disk;

FIG. 3 shows a schematic cross-sectional view of a fixed caliper disk brake with a two-sided clamping device and a fixed brake disk; and FIG. 4 shows a schematic plan view in partial cross section of a disk brake.

When the problem is described in the following on the basis of a sliding caliper disk brake, all of the explanations will also apply in an analogous sense to caliper disk brakes of the hinged caliper or fixed caliper type with one-sided or two-sided clamping in which a brake pad is held, guided, and/or supported directly on the free, that is, on the unsupported, sidepiece of the caliper. This "free sidepiece" is the sidepiece which absorbs the circumferential braking forces on this side and transmits them to the other side of the caliper via the bridge part, which spans the brake disk. The sidepiece on the other side of the brake caliper is the sidepiece that is connected to a stationary part. That is, the invention is not limited only to sliding caliper disk brakes.

According to the state of the art illustrated schematically in FIGS. 1-4, the disk brake has a brake caliper 1, the two sidepieces of which extend around a brake disk 4. The caliper is also equipped with at least one clamping device 5 mounted on one side of the brake disk to press the brake pads 2, 3 against the brake disk 4, one of these pads being supported and guided in each sidepiece of the brake caliper, one on each side of the brake disk. The brake pads 2, 3 are held/guided so that they are opposite each other and so that their axes of gravity or centers of gravity S1, S2 (FIG. 4) lie on top of each other when they are displaced toward the brake disk and meet the plane of the brake disk at a right angle.

In this case, the brake caliper 1 is connected on one side of the brake disk 4 by means of a fixed part 6 to a vehicle part 7 (not shown), which is referred to as the "axle part". By way of the fixed part 6, the braking torques absorbed by the brake caliper 1 when the brake is actuated are transmitted to the vehicle part 7 (axle part). Especially when a separate guide and support part such as a brake bracket, which absorbs the circumferential braking forces, is not provided for the brake pad 3 on the side closer to the wheel rim, when, on the contrary, this brake pad is attached directly to the free, unsupported sidepiece of the brake caliper, the brake caliper 1 has a pronounced tendency, when the brake is actuated, to tilt toward the trailing side of the brake disk, i.e., the side which trails when the brake disk 4 is rotating in rotational direction D.

As a result, the rim-side brake pad 3 is subjected to disadvantageous tapered wear as a result of nonuniform pressure on the facing, but in addition, the guide or support parts are also subjected to extreme loads; exactly which parts are subjected to these loads depends on the design of the caliper of the disk brake. In the case of a sliding caliper or hinged caliper, these parts are the pin guides 8 or bearing pins, whereas, in the case of a fixed caliper, the part in question is the mounting flange. The devices that guide or support the brake caliper on the stationary vehicle part must therefore be designed to have sufficient strength.

Disk brakes, especially the disk brakes used in commercial vehicles, are required to absorb very high braking torques when being used to decelerate a vehicle. The dimensions of the parts must therefore be suitably large. Nevertheless, even this does not always make it possible to prevent the caliper from tilting.

In the disk brake according to DE 197 43 538, therefore, in which the brake pad is attached directly to the free sidepiece of the caliper (on the rim side), the attempt is made in the case of a sliding caliper to prevent the caliper from tilting by providing the brake bracket with lateral guide arms, which extend across the brake disk to serve as a support/contact surface for the brake caliper, as a result of which it is said that the caliper can be prevented from tilting. Nevertheless, because of the narrow guide tolerances, undesirable frictional torques are caused by contact with the caliper during the braking and releasing operations, and these torques interfere with the sliding function of the caliper. The high bending and friction torques on/in the guide bearings of the sliding caliper are also disadvantageous.

Another possible way of solving the problem is described in European Patent No. 709 592, according to which the guide for the brake pad on the clamping side is again provided in the fixed part of the brake, and the brake pad on the rim side is provided on the caliper sidepiece. In this case, guide pins guide the caliper.

In both of the solutions according to the state of the art described above, the centers of gravity of the brake pads are opposite each other with respect to the brake disk. The brake pads are therefore symmetric to each other.

Because the brake according to European Patent No. 709 592 uses an almost plate-shaped brake bracket, it would be a good choice for commercial trucks simply because of its reduced weight, but disk brakes with this design, even small disk brakes and disk brakes used in passenger vehicles, suffer from enormous disadvantages, which are expressed primarily in the tendency of the brake caliper to tilt. The results of such tilting are high bending torques and friction torques (the torques which oppose the tilting of the caliper) in the caliper guides and uneven contact between the facing on the rim side and the disk, which results in disadvantageous tangential wear.

SUMMARY OF THE INVENTION

To meet the increasingly more stringent requirements which the market is imposing on sliding and fixed calipers, such as the requirements for reduced weight and for a compact and easy-to-service design, while at the same time ensuring that the brake will function reliably and will last, it is necessary under consideration of the materials used to try to take a new path based on a new and modern brake design. This is the goal that the invention has set for itself.

In other words, the invention is based on the task of improving the brakes according to the state of the art in such a way that the brake caliper is prevented from tilting.

This task is accomplished according to the invention in that the second center of gravity is offset from the first center of the gravity by a predetermined distance in the direction toward the trailing side of the brake disk, i.e., the side which trails when the brake disk is rotating in its preferred direction.

In other words, the brake is designed to be "asymmetric" in a predetermined way. As a result, a counter-torque corresponding to the amount of the offset between the two centers of gravity is produced, which opposes the torque on the side of the brake caliper connected to the fixed part of the axle. If the offset is chosen suitably, the two torques cancel each other out; they "neutralize" each other. In any case, if the offset is chosen appropriately, the caliper is prevented effectively from tilting, as a result of which the facing, especially that on the free side of the brake caliper, will make uniform contact with the disk. This results in a corresponding wear compensation. In contrast to the state of the art, the guide pins no longer have to produce a counter-torque, which is associated with elevated frictional torques; now they only need to be strong enough to absorb the force that displaces the caliper and the torque that supports it. In cases where the caliper is of the sliding type, improved support is thus also provided for the sliding movement.

It must be pointed out explicitly that it is irrelevant whether there is only a single friction element on each side of the brake disk as described on the basis of the functional example above or several individual brake pads/segments on each side of the brake disk, because the effect of producing a counter-torque by means of an offset arrangement can also be achieved equally well when several brake pads are present on each side.

Obviously, this is also true for a hinged caliper, which can swing around at least one bearing pin, and also for a fixed-caliper disk brake. As a result of the previously explained neutralization of the torques, there is also no longer any "skewing" (tilting) in the retaining or mounting areas of the brake caliper, as a result of which savings in material and weight can be achieved here, too, because of the reduction in the need for material.

It is preferable for the clamping device to have a central axis and to be designed to push the first brake pad against the brake disk, the center axis being perpendicular to the main plane of the brake disk and passing through the first center of gravity. This has the result of preventing undesirable torques.

For the same reason, it is also preferable for the offset of the second center of gravity from the first center of gravity to be present both when the brake is in the resting state and also when it is being actuated.

It is especially advantageous for mechanical reasons and therefore preferred according to the invention for the two centers of gravity to be the same radial distance away from the center axis of the brake disk. In other words, the two centers of gravity define a certain angular gap around the center of the brake disk.

An offset of the second center of gravity from the first center of gravity in the direction parallel to the brake disk can be attributable at least in part to an offset of the first brake pad from the second brake pad parallel to the brake disk.

In other words, according to one embodiment of the invention, it is provided that the brake disks are offset from each other.

In addition or as an alternative, it is also possible according to the invention for the offset of the second center of gravity from the first center of gravity in the direction parallel to the brake disk to be attributable at least in part to a difference between the designs of the first and second brake pads.

In other words, it is provided according to this embodiment of the invention that the centers of gravity are offset from each other "inside" the brake pads. This means that the two centers of gravity could still be offset from each other even if the two brake disks are arranged "symmetrically" to each other in the brake.

A preferred embodiment of the invention consists in that the offset of the second center of gravity from the first center of gravity in the direction parallel to the brake disk is attributable at least in part to a difference between the weight distributions of the first and second brake pads.

As an especially simple embodiment of the invention, it is provided that the first and/or the second brake pad is wedge-shaped in at least one cross-sectional plane.

Especially for the sake of reducing the amount of material required, it is possible according to the invention for the caliper to have an opening in an area extending across the brake disk.

To make it possible for the brake pads to be placed more efficiently, the opening according to the invention extends across the first and/or the second brake pad preferably in a projection parallel to the brake disk.

The opening in this case also preferably has the contour of a parallelogram, which, especially in cases where the brake pads are offset from each other, has the result of minimizing the width of the opening to be adapted to the offset and thus the overall width of the brake caliper. At the same time, essentially triangular strut areas are obtained on both sides of the opening in the caliper, which increase the rigidity of the caliper.

According to the invention, the brake is preferably provided with a plate-shaped bracket part, as a result of which the amount of material is minimized in this area as well. It becomes possible to use a bracket part in the form of a plate because the torques are neutralized according to the invention.

According to the invention, the bracket part is also preferably designed as an integral part of the axle part.

As already discussed above, the disk brake according to the invention is preferably a sliding caliper disk brake, a hinged caliper disk brake, or a fixed caliper disk brake with one-sided or two-sided clamping.

Finally, the brake according to the invention is designed preferably for installation in commercial vehicles.

The various features of novelty which characterize the invention are pointed out with particularity in the claims annexed to and forming a part of the disclosure. For a better understanding of the invention, its operating advantages, specific objects attained by its use, reference should be had to the drawing and descriptive matter in which there are illustrated and described preferred embodiments of the invention.

BRIEF DESCRIPTION OF THE DRAWING

The invention is explained in greater detail below on the basis of preferred exemplary embodiments with reference to the attached drawing.

DESCRIPTION OF THE PREFERRED EMBODIMENTS

To the extent that they are present, the reference numbers used in FIGS. 5-9 are the same as those used in FIGS. 1-4.

As can be seen in FIGS. 5-9, the centers of gravity S1 and S2 do not coincide as they do in the state of the art. The corresponding offset is realized according to FIGS. 5 and 6 in that the contour of the facing of the brake pad 3 is designed so that its center of gravity S2 is offset from the center of gravity S1 of the brake pad 2 by a distance V toward the trailing side of the brake disk.

The offset V toward the trailing side of the brake disk, however, is preferably achieved by shifting the brake pad 3 in a parallel direction and/or by rotating it around an angle b in the free sidepiece of the caliper (FIGS. 7 and 9) with respect to the brake pad 2. The two centers of gravity S1 and S2 thus lie in any case on an imaginary arc of a circle around the center of the brake disk 4. This design offers the advantage that linings of the same design can be used on both sides of the brake disk. This eliminates the possibility that a lining could be installed on the wrong side.

Figure 5:
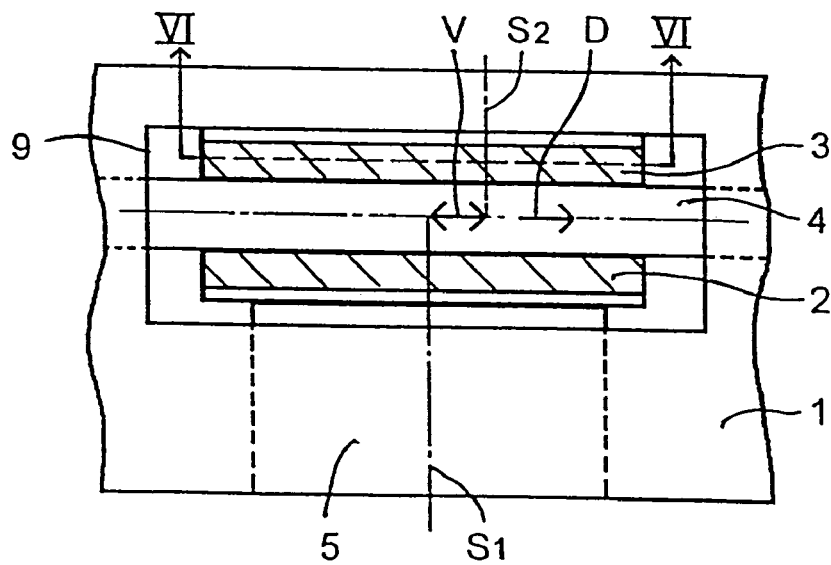
FIGS. 5-9 show schematic diagrams of various exemplary embodiments of the invention.
Figure 6:
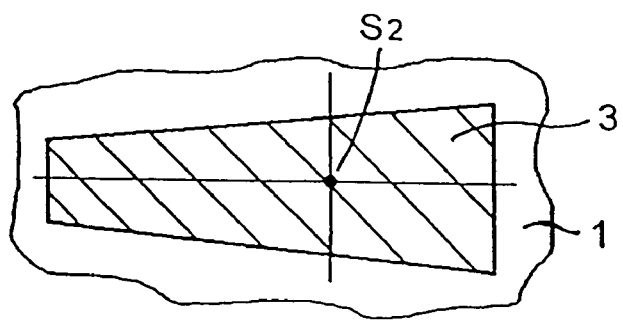
Figure 7:
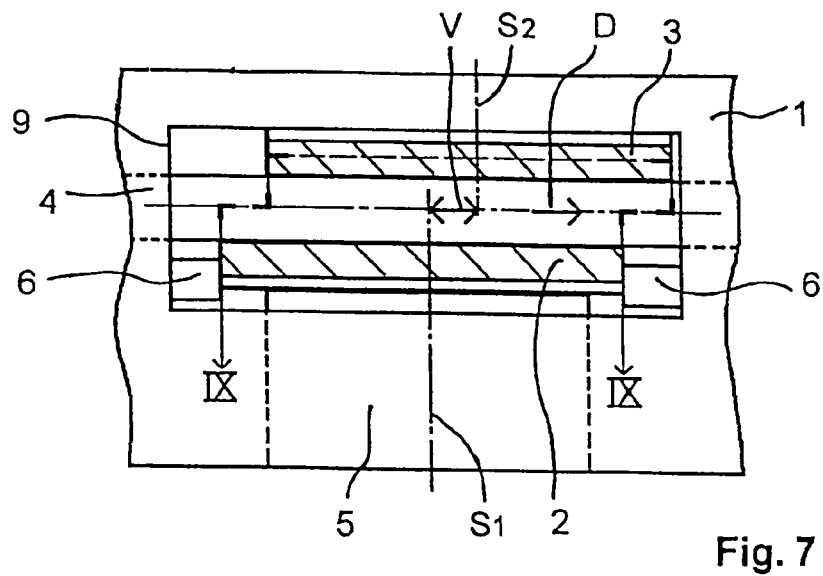
Figure 8:
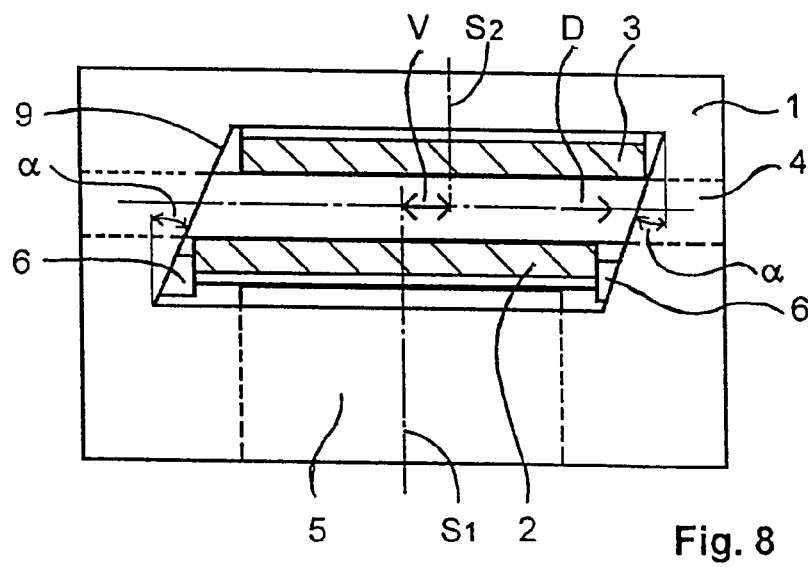
Figure 9:
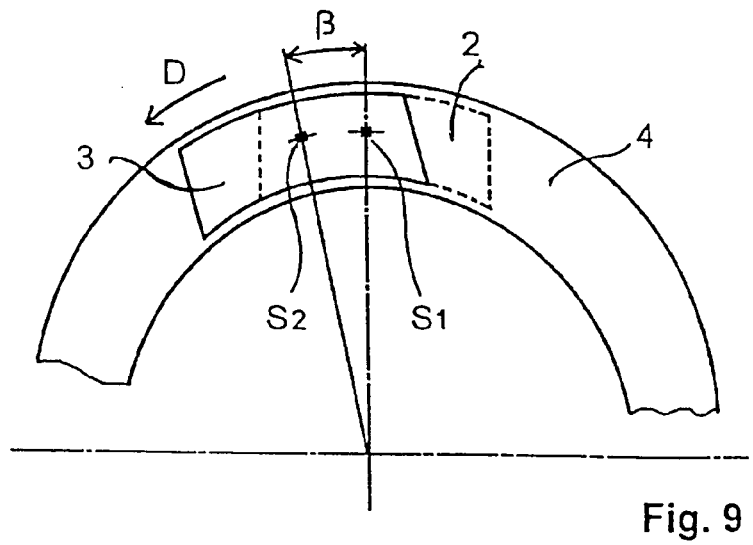

In addition to the improvement consisting of the reduction in the weight of the caliper structure, it is also possible to improve a brake with the offset arrangement of the centers of gravity S1 and S2 of the brake pads according to the invention by providing the brake caliper 1 with a radial opening 9 in the bridge area extending across the brake disk, as a result of which a better placement of the brake pads 2, 3 is achieved (FIGS. 5, 7). In the area where the brake pads 2, 3 make contact with the disk, however, the brake caliper 1 is closed, which means that the brake pads 2, 3 are supported axially over their entire width. This excludes the possibility of tilting movements and cocking.

The advantages obtained with a radial opening can be improved even more when, as can be seen in the plan view of the brake caliper (FIG. 8), the contour of the radial opening 9 extends at an angle a, slanting in the same direction as the offset V, and thus has approximately the form of a parallelogram. This has the advantage that the width of the opening to be adapted to the offset and thus also the width of the brake caliper 1 do not have to be increased by an amount equal to the offset V. At the same time, thanks to the new bridge strut areas that are approximately triangular in shape, obtained on both sides of the slanting radial opening, much greater strength is obtained in comparison with conventional bridge strut areas. This also helps to improve the rigidity of the caliper.

Figure 1:
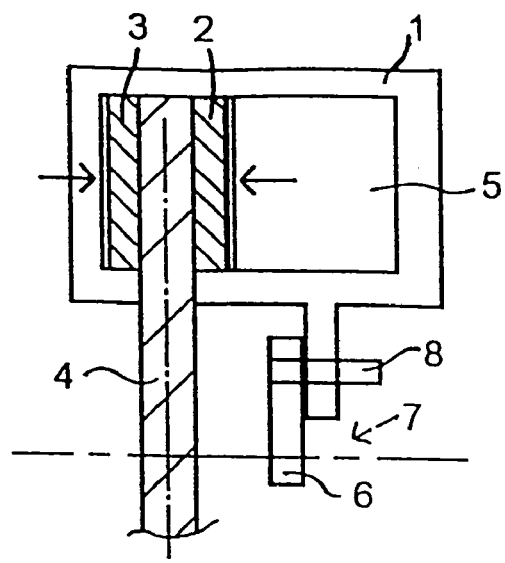
FIGS. 1-4 show schematic diagrams of various exemplary embodiments of the prior art.
Figure 2:
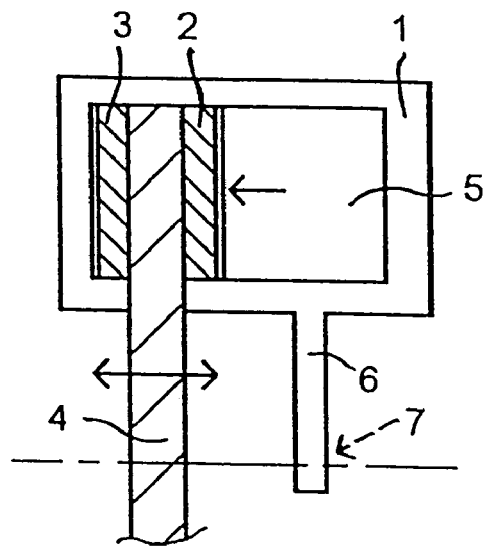
Figure 3:
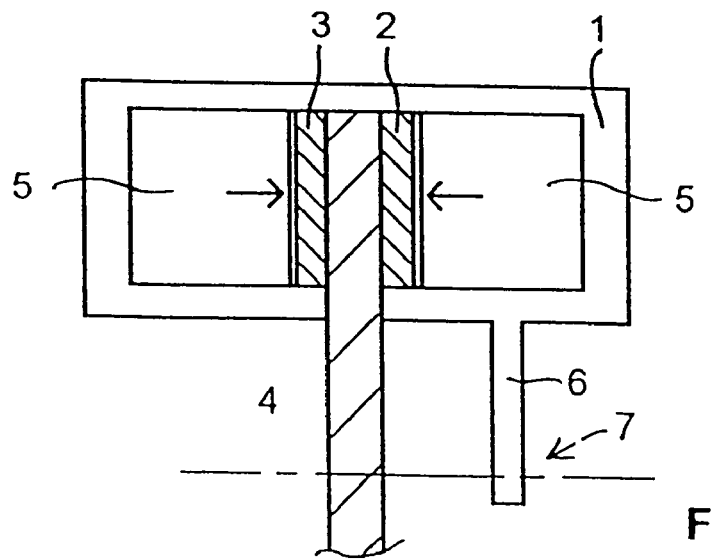
Figure 4:
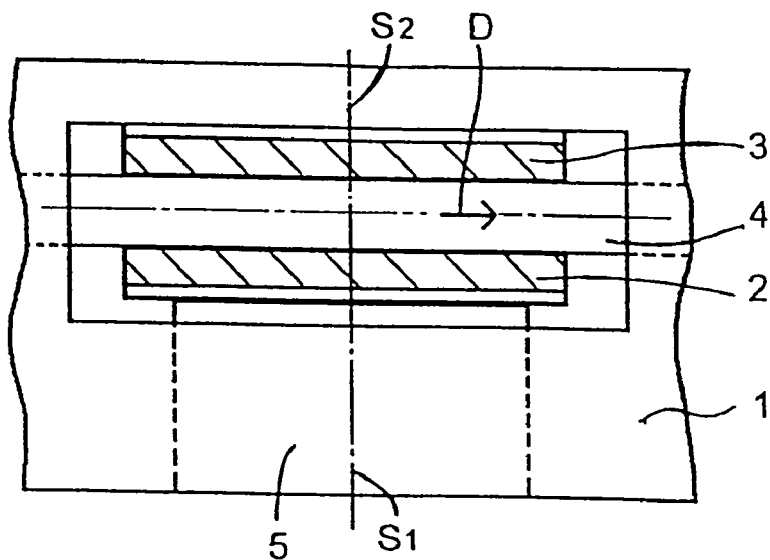

As a result of the advantages described above, a disk brake with a brake caliper 1 in the form of a sliding caliper can be used especially when, according to FIG. 1, the bracket part 6, including the guide pin(s) 8, is designed as a plate and forms a single unit with the axle part 7, this unit being produced as a forging, for example. As a result, the brake pad 2 supported on this side can also be supported/guided inside the fixed part 6, 7 that serves as the brake bracket. This can be done especially because of the neutralization of the torques according to the invention, which means that the requirements on the guidance and/or retaining devices are much less stringent with respect to, for example, their dimensions and material properties, etc., in comparison with the known solutions according to the state of the art.

A fixed value cannot be given for the offset V. Instead, the offset V for intentionally producing the required counter-torque must be calculated on the basis of the specific situation and is dependent on the coefficient of friction (matching/combination of the coefficients of friction of the brake lining and the brake disk) and the geometry of the brake (size of the brake/brake disk). These are ultimately dependent on the concrete application of the disk brake.

The same is also true for the offset angle b. This angle, too, is calculated mathematically and is dependent on the diameter of the brake disk and on the geometry of the brake. Here, too, it will be necessary to take into consideration the concrete application of the disk brake.

The features of the invention disclosed in the preceding description and in the claims and also in the drawing can be essential either alone or in any desired combinations to the realization of the invention in its various embodiments.

While specific embodiments of the invention have been shown and described in detail to illustrate the inventive principles, it will be understood that the invention may be embodied otherwise without departing from such principles.

What is claimed is:

1. A disk brake comprising
   a brake disk having a preferred rotational direction;
   a first brake pad (2) having a first center of gravity (S1) on a first side of the brake disk (4), and being the only brake pad on said first side of the brake disk
   a second brake pad (3) having a second center of gravity (S2) on a second side of the brake disk (4), and being the only brake pad on said second side of the brake disk
   a caliper (1) for transmitting braking forces produced by the second brake pad (3) to the first side of the brake disk (4); and
   a clamping device (5) which has a center axis and is configured to push the first brake pad (2) against the brake disk (4), wherein the center axis is perpendicular to the main plane of the brake disk (4) and extends through the first center of gravity (S1), wherein
   the second center of gravity (S2) is offset, both when the brake is at rest and when actuated, from the first center of gravity (S1) by a predetermined distance (V) in the circumferential direction toward the side of the brake disk (4) which trails when the disk is rotating in the preferred rotational direction (D), wherein the two centers of gravity (S1, S2) are the same radial distance away from the center axis of the brake disk (4) so that the centers of gravity are circumferentially unsymmetrical and radially symmetrical.

2. The disk brake according to claim 1, wherein the offset (V) of the second center of gravity (S2) from the first center of gravity (S1) in the direction parallel to the brake disk (4) is at least in part due to an offset of the second brake pad (3) from the first brake pad (2) parallel to the brake disk (4).

3. The disk brake according to claim 1, wherein the offset (V) of the second center of gravity (S2) from the first center of gravity (S1) in the direction parallel to the brake disk (4) is at least in part due to a difference between the configurations of the first and second brake pads (2, 3).

4. The disk brake according to claim 1, wherein the offset (V) of the second center of gravity (S2) from the first center of gravity (S1) in the direction parallel to the brake disk (4) is at least in part due to a difference between the weight distributions of the first and second brake pads (2, 3).

5. The disk brake according to claim 1, wherein the first and/or the second brake pad (2, 3) is wedge-shaped in at least one cross-sectional plane.

6. The disk brake according to claim 1, wherein the caliper (1) has an opening (9) in an area extending across the brake disk (4).

7. The disk brake according to claim 6, wherein the opening (9) extends across the first and/or the second brake pad (2, 3) in a projection parallel to the brake disk.

8. The disk brake according to claim 6, wherein the opening (9) has a contour of a parallelogram.

9. The disk brake according to claim 1, comprising a plate-shaped bracket part (6).

10. The disk brake according to claim 9, wherein the bracket part (6) is an integral part of an axle part (7).

11. The disk brake according to claim 1, wherein the brake is a hinged caliper disk brake, or a fixed caliper disk brake with one-sided or two-sided clamping.

12. The disk brake according to claim 1, wherein the brake is a brake for commercial vehicles.

13. A disk brake comprising a brake disk having a preferred rotational direction;

a first brake pad (2) having a first center of gravity (S1) on a first side of the brake disk (4), and being the only brake pad on said first side of the brake disk a second brake pad (3) having a second center of gravity (S2) on a second side of the brake disk (4), and being the only brake pad on said second side of the brake disk a sliding caliper (1) for transmitting braking forces produced by the second brake pad (3) to the first side of the brake disk (4); and a clamping device (5) which has a center axis and is configured to push the first brake pad (2) against the brake disk (4), wherein the center axis is perpendicular to the main plane of the brake disk (4) and extends through the first center of gravity (S1), wherein the second center of gravity (S2) is offset, both when the brake is at rest and when actuated, from the first center of gravity (S1) by a predetermined distance (V) in the circumferential direction toward the side of the brake disk (4) which trails when the disk is rotating in the preferred rotational direction (D), wherein the two centers of gravity (S1, S2) are the same radial distance away from the center axis of the brake disk (4) 50 that the centers of gravity are circumferentially unsymmetrical and radially symmetrical.

* * * * *